(12) United States Patent
Ostromek et al.

(10) Patent No.: US 7,091,930 B2
(45) Date of Patent: Aug. 15, 2006

(54) CENTERLINE MOUNTED SENSOR FUSION DEVICE

(75) Inventors: Timothy E. Ostromek, Richardson, TX (US); Joseph P. Estrera, Dallas, TX (US); Antonio V. Bacarella, Dallas, TX (US); Kenneth W. Sauter, Garland, TX (US); Michael J. Iosue, Phoenix, AZ (US); Timothy B. Hogan, Dallas, TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/710,754

(22) Filed: Jul. 30, 2004

(65) Prior Publication Data

US 2005/0035925 A1 Feb. 17, 2005

Related U.S. Application Data

(60) Provisional application No. 60/481,171, filed on Aug. 2, 2003.

(51) Int. Cl.
 *G09G 5/00* (2006.01)
(52) U.S. Cl. ............................ 345/8; 345/633; 345/9; 345/7
(58) Field of Classification Search .................. 345/7, 345/9, 420, 156–162, 1.1, 633; 353/28; 364/516.444; 395/125; 382/103; 359/630, 431; 348/46; 396/51; 351/211; 701/35
See application file for complete search history.

(56) References Cited

U.S. PATENT DOCUMENTS 3,879,105 A * 4/1975 Broche et al. ............... 359/431
5,495,576 A * 2/1996 Ritchey ....................... 345/420
5,526,022 A * 6/1996 Donahue et al. ............. 345/156
5,583,795 A * 12/1996 Smyth ......................... 702/150
5,864,481 A * 1/1999 Gross et al. .................. 700/90
5,889,577 A * 3/1999 Kohayakawa ................ 351/211
6,341,869 B1 * 1/2002 Inami et al. .................. 353/28
6,580,448 B1 * 6/2003 Stuttler ......................... 348/46
6,753,828 B1 * 6/2004 Tuceryan et al. ............. 345/8
2002/0057908 A1 * 5/2002 Otani ........................... 396/51
2002/0149545 A1 * 10/2002 Hanayama et al. ........... 345/7
2002/0191298 A1 * 12/2002 Bignolles et al. ............ 359/630
2004/0028258 A1 * 2/2004 Naimark et al. ............. 382/103
2004/0169617 A1 * 9/2004 Yelton et al. ................ 345/1.1
2005/0021202 A1 * 1/2005 Russell et al. ............... 701/35

FOREIGN PATENT DOCUMENTS

JP 07-333552 * 12/1995
WO WO 01/84828 * 11/2001

* cited by examiner

*Primary Examiner*—Bipin Shalwala
*Assistant Examiner*—Prabodh Dharia
(74) *Attorney, Agent, or Firm*—Marsteller & Associates, P.C.

(57) ABSTRACT

A sensor unit (F) has at least a first and second sensor (10, 12) arranged along a sensor axis (14). A head adapter (16) provides support to mount at least one selected device about a user's cranium (18). A securing module (20) is attached to the sensor unit for mounting the sensor unit (F) to the head adapter (16). The sensor unit (F) is to be mounted above an ocular axis (22) formed between a pair of eyes (24) of the user (U) when the sensor unit (F) is attached to the head adapter element (16). When the sensor unit (F) is secured to the user (U) with the head adapter element (16), the sensor axis (14) is essentially perpendicular to the user's ocular axis (22).

39 Claims, 7 Drawing Sheets

CENTERLINE MOUNTED SENSOR FUSION DEVICE

CROSS REFERENCE TO RELATED APPLICATIONS

This application claims the benefit of U.S. Provisional Application Ser. No. 60/481,171, filed Aug. 2, 2003, entitled CENTERLINE MOUNTED SENSOR FUSION DEVICE.

BACKGROUND ART

Background of the Invention

1. Technical Field

The invention relates to the field of image viewers and multiple sensor fusion viewers, and more particularly to the mounting of a man-portable versions of such viewers.

2. Background Art

Known enhanced or night vision systems generally include either an image intensifier tube or an infrared sensor assembly. Such systems are often man-portable and can be a part of a weapon sight or mounted as a unit about a user's head.

Recently systems are being developed that incorporate a plurality of sensors, each of which form an image that can be adapted to be viewed. The separate images from each sensor are then "fused" to form a composite image that includes information from the various sensor sources.

Helmet mounted display systems of various designs using image intensifier tubes have been employed for assisting both combat pilots and ground forces. However, such systems have heretofore included only a single type of sensor.

While the above cited references introduce and disclose a number of noteworthy advances and technological improvements within the art, none completely fulfills the specific objectives achieved by this invention.

SUMMARY OF INVENTION

In accordance with the present invention, a man-portable sensor fusion system includes a sensor unit that has at least a first and second sensor arranged along a sensor axis. A head adapter provides support to mount at least one selected device, such as the sensor unit, a battery holder, a view screen, or the like, about a user's cranium.

A securing module is attached to the sensor unit for mounting the sensor unit to the head adapter. The sensor unit is to be mounted above an ocular axis formed between a pair of eyes of the user when the sensor unit is attached to the head adapter element. When the sensor unit is secured to the user with the head adapter element, the sensor axis is essentially perpendicular to the user's ocular axis.

In one embodiment, the head adapter element comprises a known ballistic helmet commonly used by military members during combat operations or fire and rescue personnel performing their duties.

In another embodiment the head adapter element is a frame structure that is adapted to mount or fit about a user's head.

These and other objects, advantages and features of this invention will be apparent from the following description taken with reference to the accompanying drawings, wherein is shown the preferred embodiments of the invention.

BRIEF DESCRIPTION OF THE DRAWINGS

Brief Description of the Drawings

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DISCLOSURE OF INVENTION

Detailed Description

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A man-portable sensor fusion system M includes a sensor unit F that has at least a first and second sensor 10, 12 arranged along a sensor axis 14. A head adapter element 16 provides support to mount at least one selected device about a user's cranium 18. A securing module 20 is attached to the sensor unit F for mounting the sensor unit F to the head adapter 16. The sensor unit F is to be mounted above an ocular axis 22 formed between a pair of eyes 24 of the user U when the sensor unit F is attached to the head adapter element 16. Also, when the sensor unit F is secured to the user U with the head adapter element 16, the sensor axis 14 is essentially perpendicular to the user's ocular axis 22.

Figure 1:
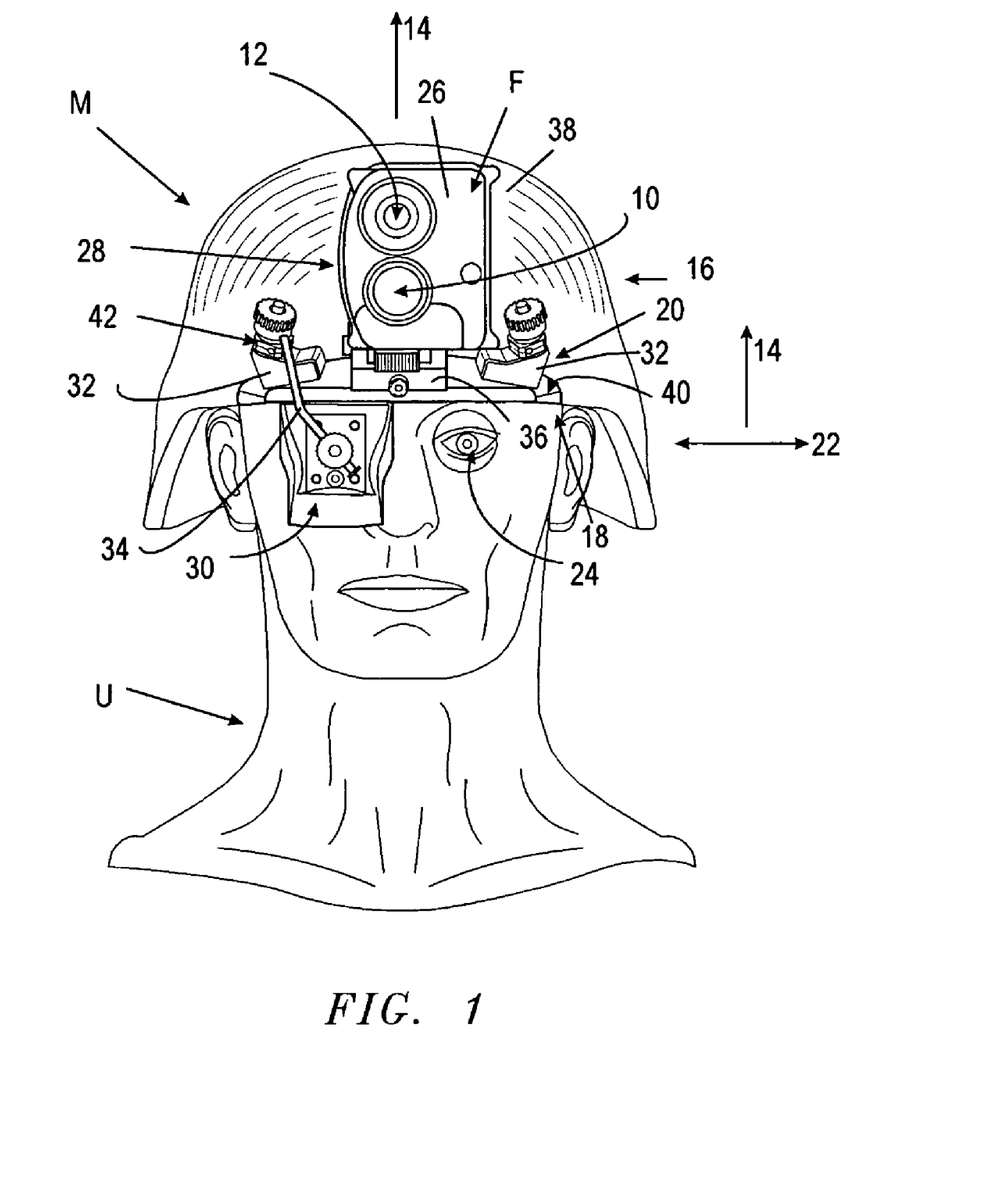
FIG. 1 is a front view of the present invention mounted on a ballistic type helmet worn by a user.
Figure 2:
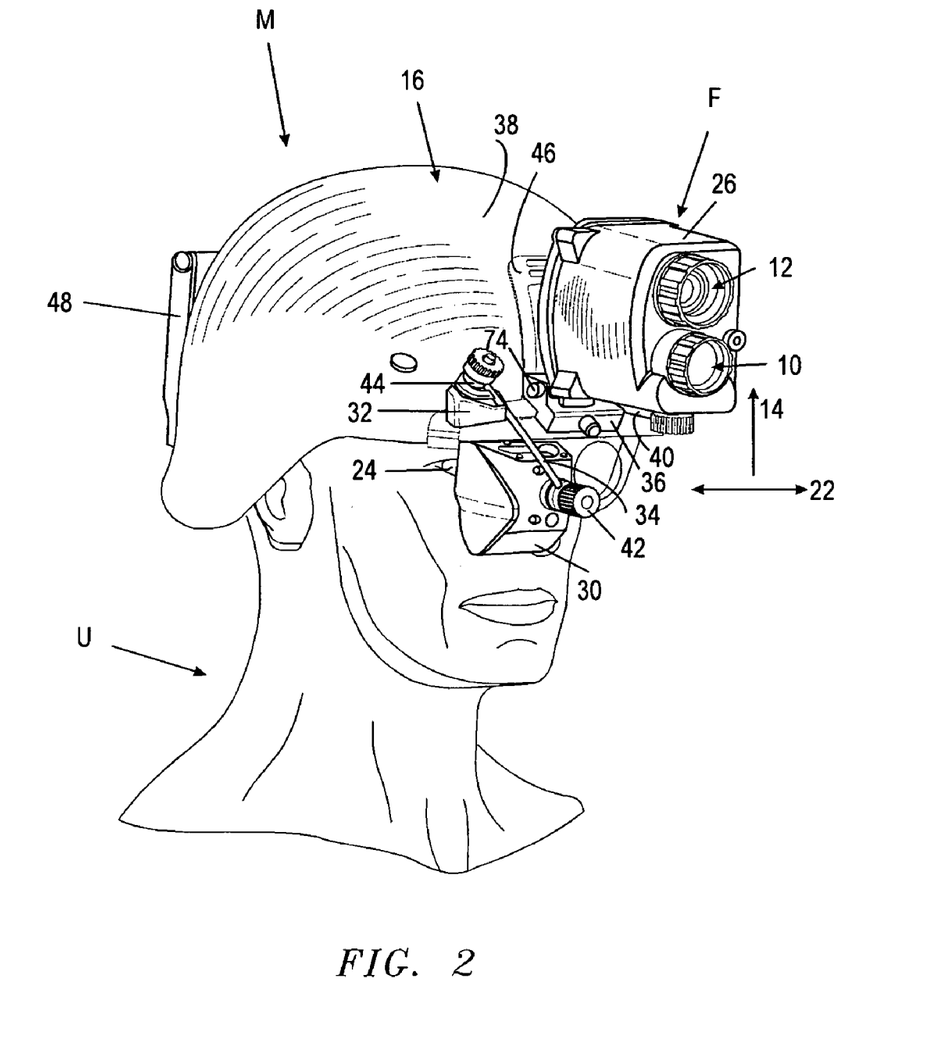
FIG. 2 is a frontal perspective view of a sensor fusion device of the present invention resting on a user's head.

In FIG. 1 a sensor fusion device F is shown with two sensors 10 and 12. The sensor fusion device includes the sensor body 26 that houses the two sensors 10 and 12. The sensors may be an image intensified camera, such as an image intensifier tube coupled with a Charge Coupled Device (CCD), and a thermal imager, such as an infrared camera, although any suitable sensors that produce an output image may be utilized.

The main body 28 of the sensor fusion device may also contain electronic circuitry to receive the image signals from the respective sensors and controllably fuse or overlay the images from the plurality of sensors. The resulting fused image is then displayed on a video or imaging screen unit also mounted with clamp 32 and connecting arm 34 to the head adapter element 16. The video display unit 30 is preferably movable for positioning in front of an eye 24 of the user in order that the user may see or otherwise perceive of the displayed image from the viewer unit 40.

The main body 28 similarly is attached to the head adapter element 16 using a clamping assembly 36. Preferably the clamping assembly 36 is removable from the head adapter 16 to improve maintenance and repair and permit removal of the sensor fusion device F from the user's head covering.

FIGS. 1 through 7 depict the present sensor fusion device F mounted with a ballistic helmet of the type used by ground forces in the military. Other types of helmets may similarly be used, such as those worn by pilots, or fire or rescue workers. Other types of head coverings may be utilized as described in more detail below.

Figure 3:
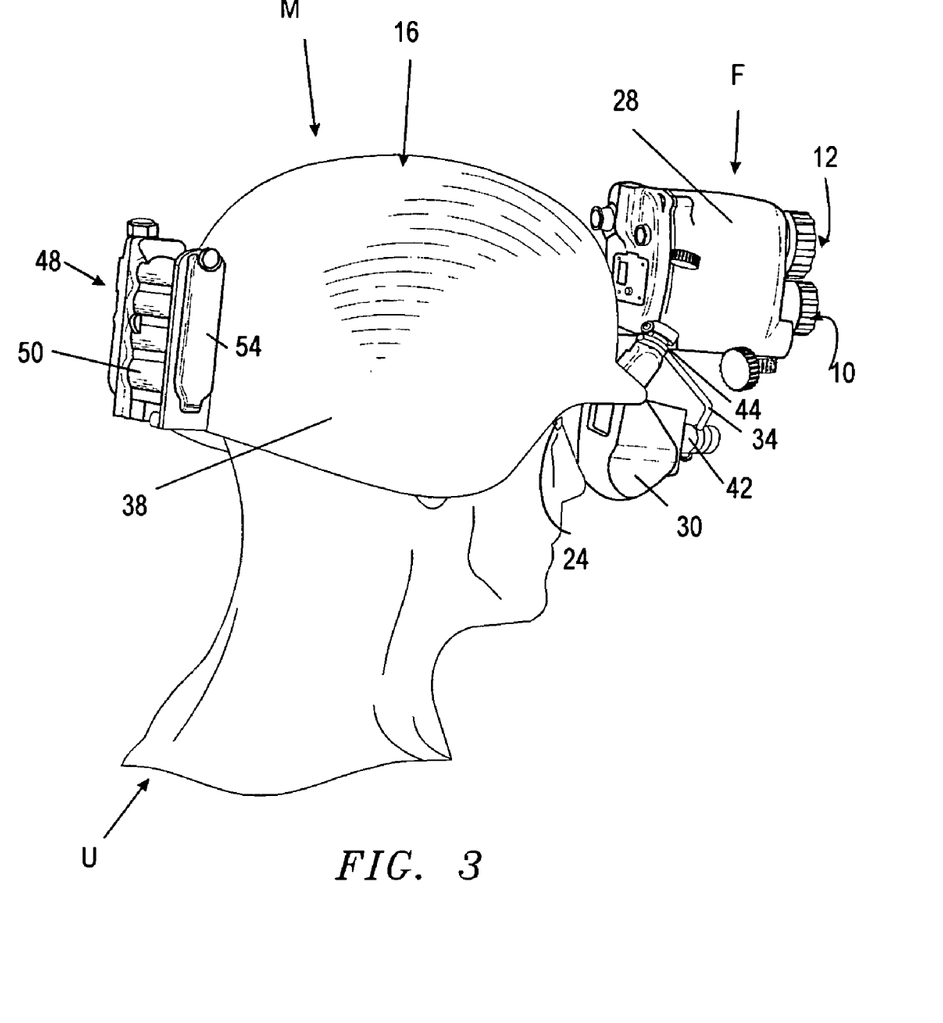
FIG. 3 is a rear perspective view of a sensor fusion device with a separate battery holder resting on a user's head.

Referring particularly to FIGS. 1 and 3, a clamping bar 40 is attached to the brow of the helmet 38. The housing 26 of the main body 28 is clamped to the mounting bar 40 with clamp 36. Similarly, the video display 30 is supported from the mounting bar 40 using the connecting arm 34 that extends between a pair of couplers 32 and 42. The connecting arm 34 is desirably pivotally mounted to clamp 32 about pivot 44 that permits the proper positioning of video display 30 in front of the user's eye 24. A support panel 46 further supports the main body 38 mounting to the helmet 38.

The clamping bar 40 is firmly affixed to the helmet 38 with a pair of clamps 36 attached at both ends of the clamping bar 40.

When the main body 28 of the sensor fusion device F is attached to the clamping bar 40, the main body 28 with the two sensors 10, 12 are above the ocular axis 22 and are on the side of the ocular axis 22 opposite to the side where the feet of the user may be found. In other words, the main body 28 is mounted above the eyes 24 of the user U and toward the top of the user's cranium 18.

In most embodiments the sensor fusion device F will be battery powered by known battery cells. In such a case, it would be desirable for weight distribution to have a separate battery holder that is mounted on the back side of the helmet 38 or head adapter element 16 in relation to the main body 28 of the sensor fusion device F.

Figure 4:
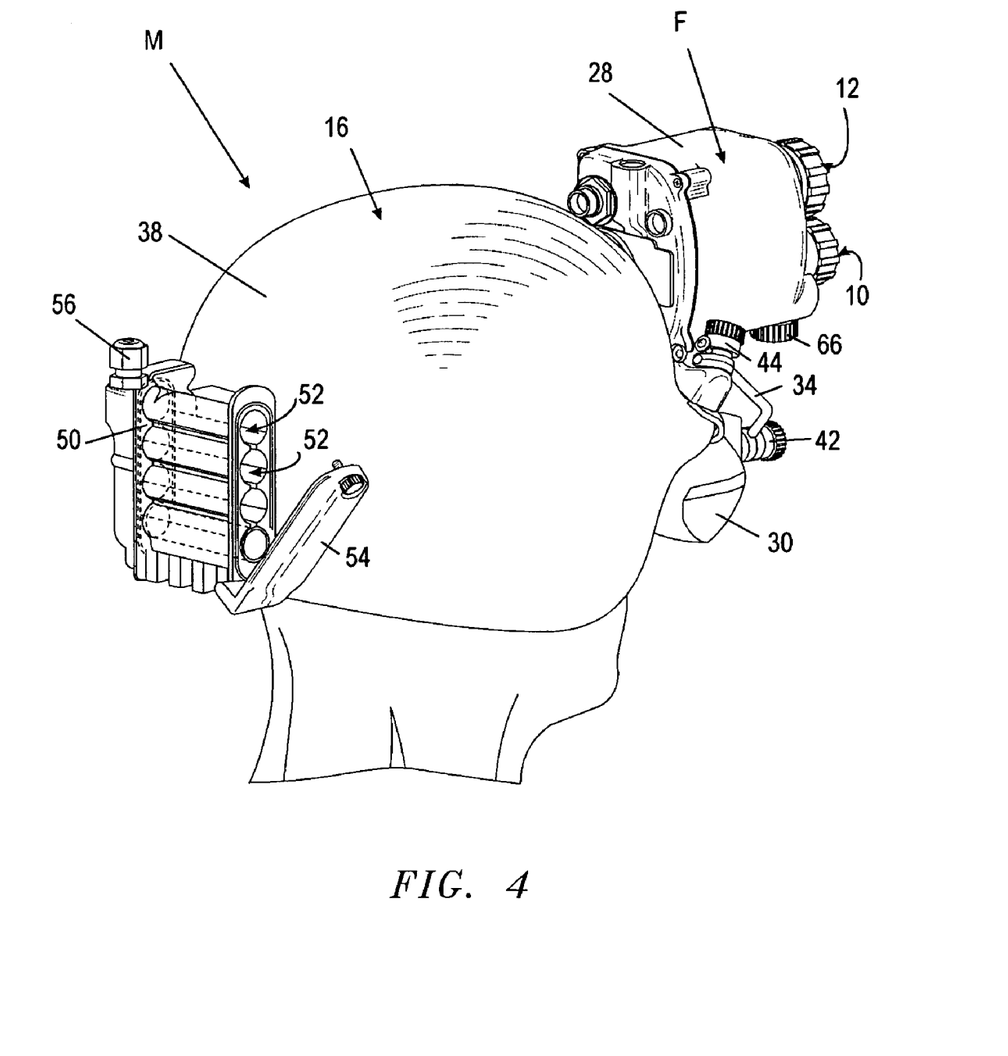
FIG. 4 is another rear perspective view of present sensor fusion device with the exterior housing of the separate battery holder shown in phantom.

FIG. 4 illustrates the exterior housing 50 in phantom and four showing spaces 52, as example, to secure four standard cell batteries, such as M size. A removable door 54 may open to expose the batteries (not shown) and the battery compartments 52.

Figure 5:
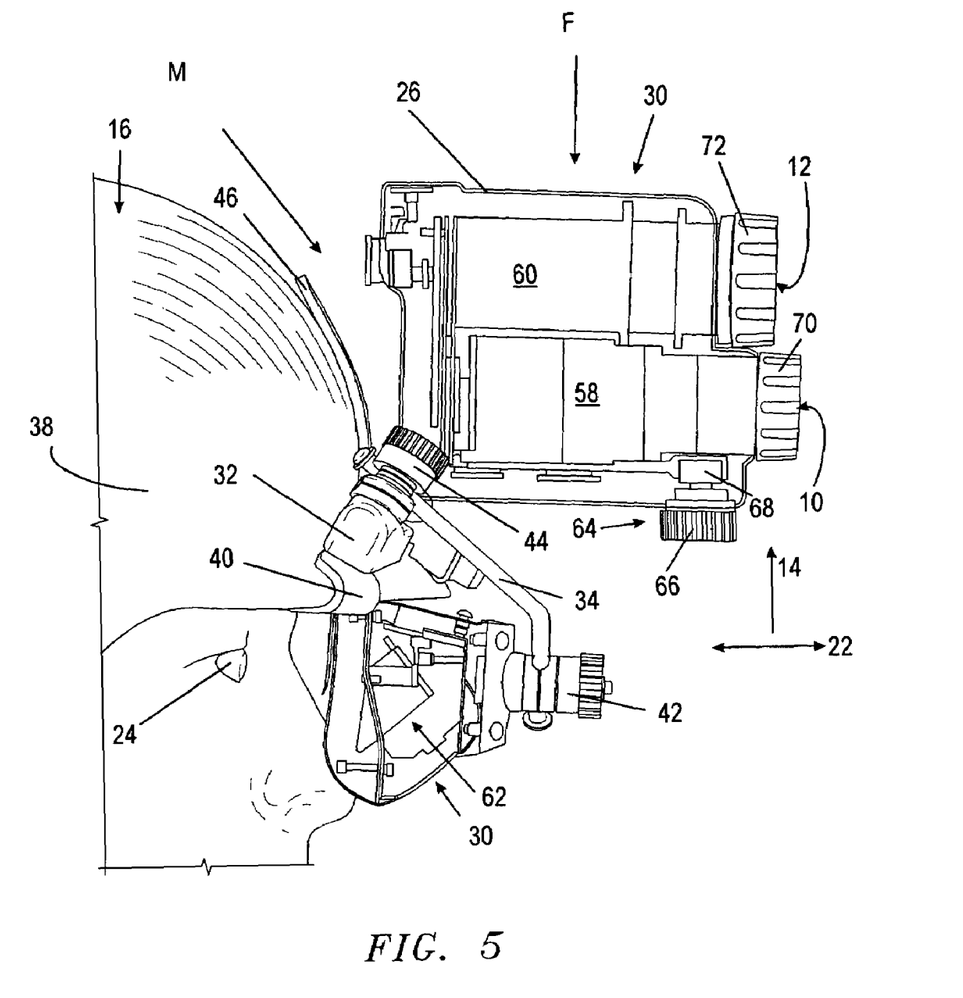
FIG. 5 is a side view of the present sensor fusion device with the main body and video display unit shown in cross section.

Referring now to FIG. 5 particularly, the main body 28 of the sensor fusion device F is shown in cross section exposing some of the interior components. As an example, the first sensor 10 comprises an image intensifier camera 58 and the second sensor 12 includes a thermal imaging or IR camera 60. It should be understand that the choice of sensors is a matter of design based on the ability to produce a signal appropriate for the fusion system.

The exterior housing of the video display unit 30 is also shown in cross section depicting the display screen 62 that is seen by the user U.

Figure 8:
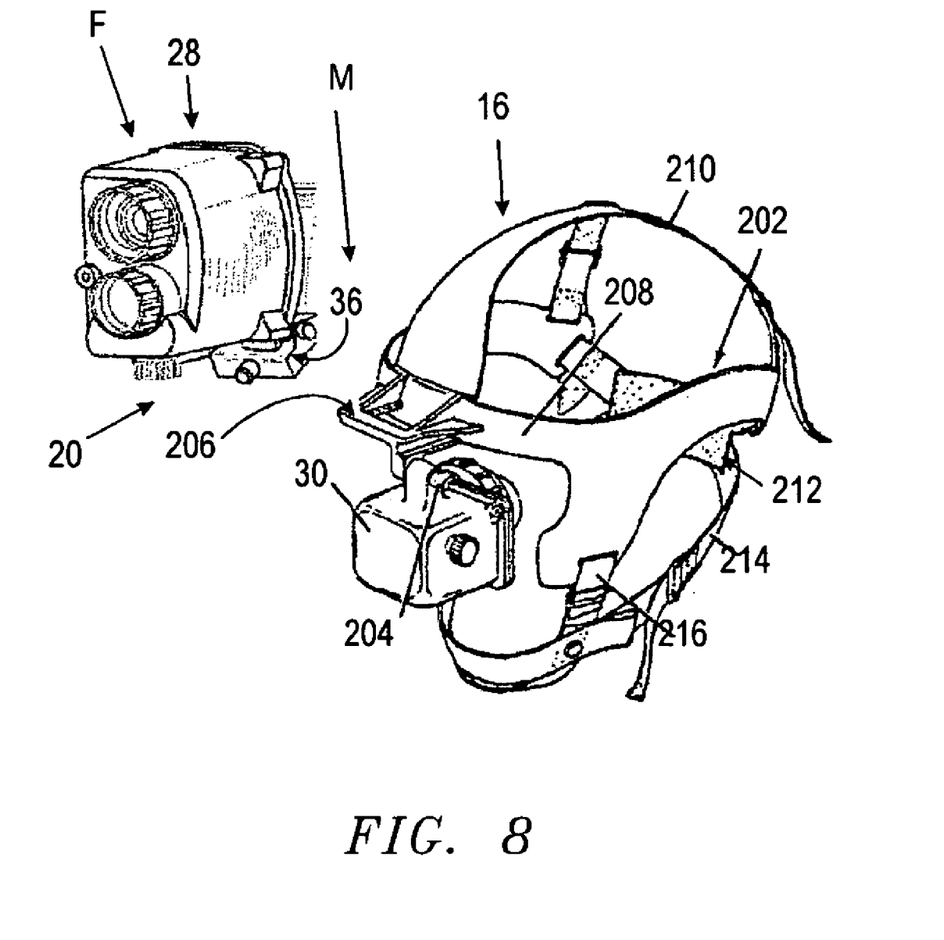
FIG. 8 is an oblique view of the present sensor fusion device adapted for mounting with a headgear.

In FIG. 8 an alternative head adapter element 16 is shown. The headgear or face frame structure 202 is shown for mounting the video display component 30 adjacent an eye 24 of the wearer U. The video display component is mounted by a pivotal connection 204 to an overhanging frame structure 206 such that the video display unit 30 is cantilevered in front of the user's eye 24. The frame structure 206 is formed integral with a headband 208 of the headgear 202. Straps 210, 212, 214, and 216 secure the headgear 202 to the wearer's head. With this arrangement a helmet 38 can be easily worn, if desired, over the headgear 202.

Figure 7:
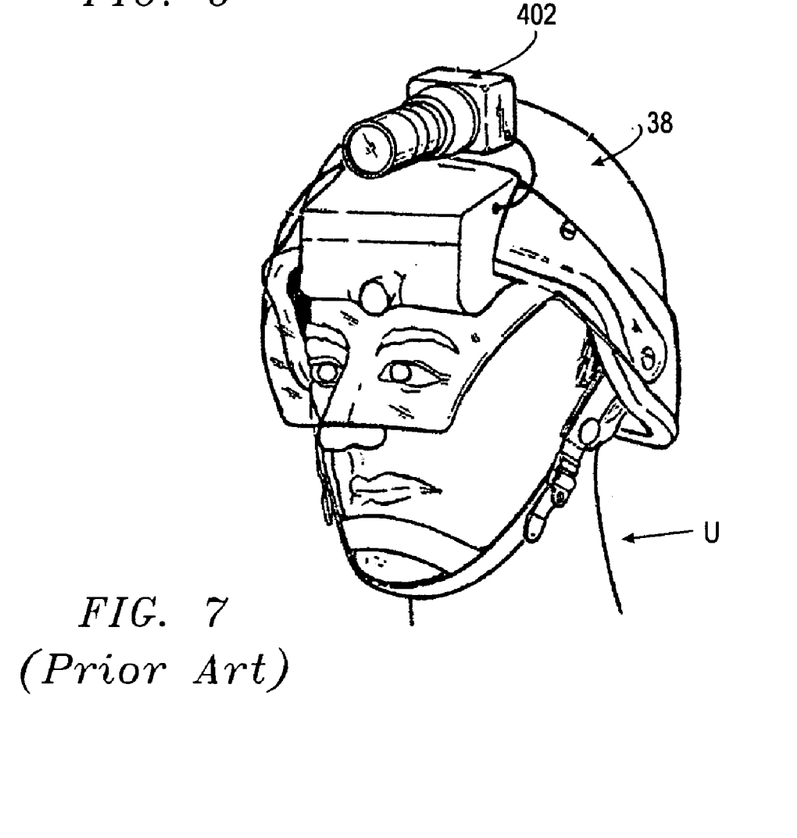
FIG. 7 shows a prior art helmet mounted night vision display system.

FIG. 7 depicts one form of a prior video display device with a single camera or sensor 402 mounted above the eyes of the wearer U. However, when two or more sensors are used that are not mounted co-axially, then there is an issue of parallax distortion in the two images that arises.

Tilt Properties of the Camera(s):

Desirably the mounting system of the sensor fusion device F permits the tilting of the main body 28 such that the plurality of sensors remain lined up along the sensor axis 14. The titling is permitted by a pivot 74 located at the base of the main body 28 where the main body 28 connects to the mounting bar 40. See FIG. 2.

Parallax Compensation:

Again with reference to FIG. 5, the present sensor fusion device F may optionally include a parallel compensation capability. The issue of parallax distortion arises because the optical axis of each of the plurality of sensors is off-center relative to one another. In other words since the sensors are not co-axially aligned, overlapping the images may be less precise because of differences in the scene due to the parallax distortion.

While the electronic circuitry may be designed to make corrections when the images are fused, the present invention may also include a mechanical parallax correction mechanism 64 including a user accessible knob 66 connected to a screw mechanism 68 to raise or lower one end of the image intensifier camera 58. User adjustment would bring the optical axis of the first sensor 10 into a position such that the first sensor optical axis intersects with the optical axis of the second sensor 12 at a desired point ahead of the main body 28 of the sensor fusion device.

Parallax correction electronic circuitry may be used not only to correct parallax, but to correct for error in assembly or for wide mechanical design tolerances. Such correction is not possible with alternative overlay image fusion techniques.

The position of a mechanical focus device for the sensors of the main body 28 may also serve as input to the parallax correction algorithm.

Alternatively or in addition to the tilt properties as described above, electronic analysis of the sensor images (for example through cross-correlation of the images) may be used in conjunction with foreknowledge of the physical mounting of the sensor cameras 10 and 12 to electronically correct parallax for the scene presently being viewed.

Focus Range Compensation:

Similar to the parallax correction capabilities and with regard to focus range compensation, while the electronic circuitry may be designed to make corrections when the images are fused, the present invention may also include a mechanical focus range compensation mechanism including one or more user accessible rings 70 and 72 connected to the image intensifier camera 58 and to the thermal imaging camera 60, respectively. User adjustment would bring the optical focus of the first sensor 10 into desired optical sensing range by manually adjusting the focus range of the first sensor with adjustment ring 70. Likewise, user adjustment could bring the focus of the second sensor 12 into desired a sensing range by manually adjusting the focus range of the second sensor with adjustment ring 72.

Remote Digital Battle Space Interface:

U.S. Pat. Nos. 4,786,966, issued Nov. 22, 1988; 4,884,137, issued Nov. 28, 1989; 4,970,589, issued Nov. 13, 1990;

5,005,213, issued Apr. 2, 19991; and, 5,200,827, issued Apr. 6, 1993 teach using man portable video display systems, mounting schemes for them, and covertly sending images to supporting and commanding echelons. The disclosures of which patents are incorporated by reference in this disclosure as if fully set forth.

The present sensor fusion device F may also be adapted for either wired or wireless communication with other unit members of the user of the sensor fusion device F or may even transmit desired images to other support or command echelons.

Similarly, the main body 28 may be operably connected to the video display unit 30 for transmission of a video signal from the main body 28 using known techniques and methods as desired. Such connection techniques include optical, electrical wired, or wireless connection methods.

Figure 6:
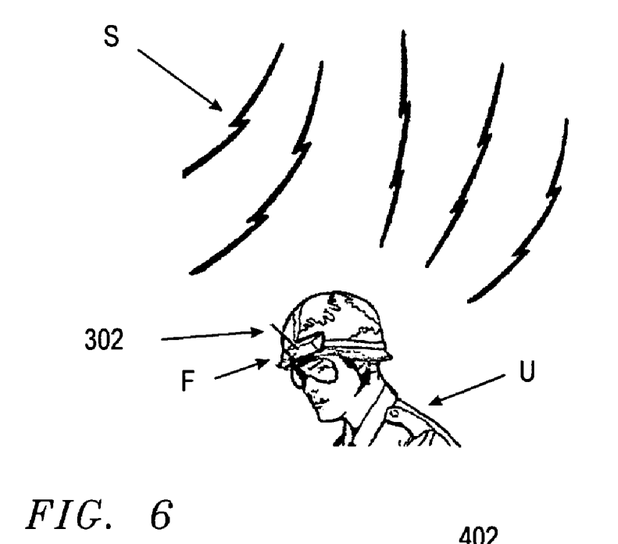
FIG. 6 illustrates the head gear mounted sensor fusion device transmitting a signal.

Referring specifically to FIG. 6, a selected signal S may be sent from the sensor fusion device F via a transmitting or transceiver type antenna 302 either internal to the sensor fusion device F or a separated transmitting unit. FIG. 6 schematically depicts an antenna 302 for illustrative purposes, although other types and forms of antennae and wired connections may be utilized.

Specifically, the system F may be configured for a specific situation (for example, map uploads or video capture) through such a wired or wireless interface, for example a known type of COTS flash memory card. Also, such nonvolatile storage devices may be used to capture and save images, video, or data in the absence of a live connection, or for later transmission through a live connection.

Alternatively, a transmitting antenna or hard-wired connector 56 may be located with the battery holder 48 as depicted in FIG. 4.

The foregoing disclosure and description of the invention are illustrative and explanatory thereof, and various changes in the size, shape and materials, as well as in the details of the illustrated construction may be made without departing from the spirit of the invention.

The invention claimed is:

1. A man-portable sensor fusion system comprising:
sensor unit having at least a first and second sensor arranged along a sensor axis;
head adapting means for providing support to mount at least one selected device about a user's cranium; and,
securing means attached to the sensor unit for mounting the sensor unit to the head adapter; the sensor unit being mounted above an ocular axis formed between a pair of eyes of the user when the sensor unit is attached to the head adapter element; the sensor axis when the sensor unit is secured to the user with the head adapter element is essentially perpendicular to the user's ocular axis.

2. The invention of claim 1 wherein the adapter element is a frame structure for wearing by the user.

3. The invention of claim 1 wherein the adapter element is a head covering for wearing by the user.

4. The invention of claim 1 wherein the adapter element is a ballistic helmet for wearing by the user.

5. The invention of claim 1 wherein the sensor unit is battery powered.

6. The invention of claim 5 wherein a battery holder element is attached to the head adapter element such that the battery holder is on an opposite side of the user's cranium to the sensor unit when being used by the user.

7. The invention of claim 1 wherein the sensor unit is adapted to transmit a desired signal for reception.

8. The invention of claim 1 wherein the sensor unit is adapted to compensate for parallax distortion between the plurality of sensors.

9. The invention of claim 1 wherein the securing means is adapted to permit tilting of the sensor unit.

10. The invention of claim 1 wherein the securing means is adapted to permit detachment of the sensor unit.

11. The invention of claim 1 further including a video means operably connected to the plurality of sensors for displaying an image.

12. The invention of claim 11 wherein a video unit attaches to the head adapter.

13. The invention of claim 12 wherein the video unit is detachable from the head adapter.

14. A man-portable sensor fusion system including a sensor unit of the type having at least a first and second sensor arranged along a sensor axis, the invention comprising:
head adapting means for providing support to mount at least one selected device about a user's cranium; and,
securing means attached to the sensor unit for mounting the sensor unit to the head adapter; the sensor unit being mounted above an ocular axis formed between a pair of eyes of the user when the sensor unit is attached to the head adapter element; the sensor axis when the sensor unit is secured to the user with the head adapter element is essentially perpendicular to the user's ocular axis.

15. The invention of claim 14 wherein the adapter element is a frame structure for wearing by the user.

16. The invention of claim 14 wherein the adapter element is a head covering for wearing by the user.

17. The invention of claim 14 wherein the adapter element is a ballistic helmet for wearing by the user.

18. The invention of claim 14 wherein the sensor unit is battery powered.

19. The invention of claim 18 wherein a battery holder element is attached to the head adapter element such that the battery holder is on an opposite side of the user's cranium to the sensor unit when being used by the user.

20. The invention of claim 14 wherein the sensor unit is adapted to transmit a desired signal for reception.

21. The invention of claim 14 wherein the sensor unit is adapted to compensate for parallax distortion between the plurality of sensors.

22. The invention of claim 14 wherein the securing means is adapted to permit tilting of the sensor unit.

23. The invention of claim 14 wherein the securing means is adapted to permit detachment of the sensor unit.

24. The invention of claim 14 further including a video means operably connected to the plurality of sensors for displaying an image.

25. The invention of claim 24 wherein a video unit attaches to the head adapter.

26. The invention of claim 25 wherein the video unit is detachable from the head adapter.

27. A method for mounting a man-portable sensor fusion system including a sensor unit of the type having at least a first and second sensor arranged along a sensor axis, comprising the steps of:
providing a head adapter element for providing support to mount at least one selected device about a user's cranium; and,
mounting the sensor unit to the head adapter; the sensor unit being mounted above an ocular axis formed between a pair of eyes of the user when the sensor unit is attached to the head adapter element; the sensor axis when the sensor unit is secured to the user with the head adapter element is essentially perpendicular to the user's ocular axis.

28. The method of claim 27 wherein the adapter element is a frame structure for wearing by the user.

29. The method of claim 27 wherein the adapter element is a head covering for wearing by the user.

30. The method of claim 27 wherein the adapter element is a ballistic helmet for wearing by the user.

31. The method of claim 27 wherein the sensor unit is battery powered.

32. The method of claim 31 wherein a battery holder element is attached to the head adapter element such that the battery holder is on an opposite side of the user's cranium to the sensor unit when being used by the user.

33. The method of claim 27 wherein the sensor unit is adapted to transmit a desired signal for reception.

34. The method of claim 27 wherein the sensor unit is adapted to compensate for parallax distortion between the plurality of sensors.

35. The method of claim 27 wherein the securing means is adapted to permit tilting of the sensor unit.

36. The method of claim 27 wherein the securing means is adapted to permit detachment of the sensor unit.

37. The method of claim 27 further including a video means operably connected to the plurality of sensors for displaying an image.

38. The method of claim 37 wherein a video unit attaches to the head adapter.

39. The method of claim 38 wherein the video unit is detachable from the head adapter.

* * * * *